(12) United States Patent
Zaizen et al.

(10) Patent No.: US 11,225,699 B2
(45) Date of Patent: Jan. 18, 2022

(54) METHOD FOR PRODUCING NON-ORIENTED ELECTRICAL STEEL SHEET

(71) Applicant: JFE STEEL CORPORATION, Tokyo (JP)

(72) Inventors: Yoshiaki Zaizen, Tokyo (JP); Tomoyuki Okubo, Tokyo (JP); Yoshihiko Oda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 389 days.

(21) Appl. No.: 15/775,848

(22) PCT Filed: Oct. 3, 2016

(86) PCT No.: PCT/JP2016/079252
§ 371 (c)(1),
(2) Date: May 14, 2018

(87) PCT Pub. No.: WO2017/086036
PCT Pub. Date: May 26, 2017

(65) Prior Publication Data
US 2018/0327883 A1    Nov. 15, 2018

(30) Foreign Application Priority Data

Nov. 20, 2015 (JP) .............................. JP2015-227485
Aug. 18, 2016 (JP) .............................. JP2016-160644

(51) Int. Cl.
*C21D 9/46* (2006.01)
*C22C 38/50* (2006.01)
(Continued)

(52) U.S. Cl.
CPC ............... *C21D 9/46* (2013.01); *C21D 6/004* (2013.01); *C21D 6/005* (2013.01); *C21D 8/005* (2013.01);
(Continued)

(58) Field of Classification Search
CPC .................................... C21D 9/46; C21D 8/12
(Continued)

(56) References Cited

U.S. PATENT DOCUMENTS 4,898,626 A    2/1990 Shoen et al.
4,898,627 A    2/1990 Schoen
(Continued)

FOREIGN PATENT DOCUMENTS

CN    101218362 A    7/2008
CN    102959099 A    3/2013
(Continued)

OTHER PUBLICATIONS

Translation of WO 2016/136095 (Year: 2016).*
(Continued)

*Primary Examiner* — Coris Fung
*Assistant Examiner* — Danielle Carda
(74) *Attorney, Agent, or Firm* — Oliff PLC

(57) ABSTRACT

A method for producing a non-oriented electrical steel sheet by hot rolling a steel slab having a chemical composition including C: not more than 0.0050 mass %, Si: not more than 4.0 mass %, Mn: 0.03-3.0 mass %, P: not more than 0.1 mass %, Se: not more than 0.0010 mass %, Al: not more than 3.0 mass %, Ni: not more than 3.0 mass %, Cr: not more than 5.0 mass %, Ti: not more than 0.003 mass %, and Nb: not more than 0.003 mass % and subjecting the sheet to hot band annealing if necessary, a cold rolling, and further a finish annealing, wherein the heating in the finish annealing is conducted in two stages of performing induction heating and
(Continued)

subsequently a radiation heating and a zone from 600° C. to 740° C. in the induction heating is heated at an average heating rate of not less than 50° C./sec, whereby a high magnetic flux density can be obtained stably.

12 Claims, 1 Drawing Sheet

(51) Int. Cl.
| | |
|---|---|
| C22C 38/48 | (2006.01) |
| C22C 38/34 | (2006.01) |
| C22C 38/06 | (2006.01) |
| C22C 38/00 | (2006.01) |
| C21D 8/12 | (2006.01) |
| C21D 8/00 | (2006.01) |
| C21D 6/00 | (2006.01) |
| C22C 38/58 | (2006.01) |
| C22C 38/02 | (2006.01) |
| C22C 38/04 | (2006.01) |
| C22C 38/60 | (2006.01) |

(52) U.S. Cl.
CPC .......... *C21D 8/1272* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/34* (2013.01); *C22C 38/48* (2013.01); *C22C 38/50* (2013.01); *C22C 38/58* (2013.01); *C22C 38/60* (2013.01); *C21D 6/008* (2013.01); *C21D 8/1233* (2013.01); *C22C 2202/02* (2013.01); *Y02P 10/25* (2015.11)

(58) Field of Classification Search
USPC .......................................................... 148/111
See application file for complete search history.

(56) References Cited

U.S. PATENT DOCUMENTS

| | | | |
|---|---|---|---|
| 9,920,393 B2 | 3/2018 | Zaizen et al. | |
| 10,316,382 B2 | 6/2019 | Okubo et al. | |
| 2002/0066500 A1 | 6/2002 | Kawano et al. | |
| 2004/0016530 A1 | 1/2004 | Schoen et al. | |
| 2004/0149355 A1 | 8/2004 | Kohno et al. | |
| 2009/0050622 A1* | 2/2009 | Pohl | C21D 1/42 |
| | | | 219/602 |
| 2009/0202383 A1 | 8/2009 | Tanaka et al. | |
| 2010/0158744 A1 | 6/2010 | Murakami | |
| 2012/0037277 A1* | 2/2012 | Kumano et al. | C23C 8/02 |
| 2013/0146187 A1 | 6/2013 | Zaizen et al. | |
| 2013/0263981 A1 | 10/2013 | Zaizen et al. | |
| 2013/0306200 A1 | 11/2013 | Kohno et al. | |
| 2014/0342150 A1 | 11/2014 | Wakisaka | |
| 2014/0345751 A1 | 11/2014 | Oda et al. | |
| 2015/0059929 A1 | 3/2015 | Zaizen et al. | |
| 2015/0136278 A1 | 5/2015 | Nakanishi et al. | |
| 2015/0211089 A1 | 7/2015 | Fukunaga et al. | |
| 2015/0213928 A1 | 7/2015 | Toda et al. | |
| 2015/0357101 A1* | 12/2015 | Zaizen | C22C 38/001 |
| | | | 148/111 |
| 2018/0327883 A1 | 11/2018 | Zaizen et al. | |

FOREIGN PATENT DOCUMENTS

| | | | | |
|---|---|---|---|---|
| CN | 103270179 A | 8/2013 | | |
| CN | 103451399 A | 12/2013 | | |
| CN | 104136637 A | 11/2014 | | |
| CN | 104603298 A | 5/2015 | | |
| CN | 104937118 A | 9/2015 | | |
| EP | 0334223 A2 | 9/1989 | | |
| EP | 0334224 A2 | 9/1989 | | |
| EP | 2657355 A1 | 10/2013 | | |
| JP | S57-094524 A | 6/1982 | | |
| JP | S58-181822 A | 10/1983 | | |
| JP | H01-290716 A | 11/1989 | | |
| JP | H02-11728 A | 1/1990 | | |
| JP | H0375313 A | 3/1991 | | |
| JP | H09157804 A | 6/1997 | | |
| JP | 2001-316729 A | 11/2001 | | |
| JP | 2010-280936 A | 12/2010 | | |
| JP | 2011-256437 A | 12/2011 | | |
| JP | 2012-046806 A | 3/2012 | | |
| JP | 2012-132070 A | 7/2012 | | |
| JP | 2013-010982 A | 1/2013 | | |
| JP | 2013-091837 A | 5/2013 | | |
| JP | 2014-037581 A | 2/2014 | | |
| JP | 2014-173099 A | 9/2014 | | |
| WO | 2013/046661 A1 | 4/2013 | | |
| WO | 2013/054514 A1 | 4/2013 | | |
| WO | 2014/034931 A1 | 3/2014 | | |
| WO | 2014/129034 A1 | 8/2014 | | |
| WO | WO-2014129034 A1 * | 8/2014 | ............ C21D 6/005 | |
| WO | WO 2016/017263 * | 2/2016 | ............... C21D 9/46 | |
| WO | WO 2016/136095 A1 * | 9/2016 | ............... C21D 8/12 | |

OTHER PUBLICATIONS

Translation of WO 2016/017263 (Year: 2016).*
Dec. 19, 2019 Office Action issued in Canadian Patent Application No. 3,005,579.
Dec. 6, 2016 International Search Report issued in International Patent Application No. PCT/JP2016/079252.
May 22, 2018 International Preliminary Report on Patentability issued in International Patent Application No. PCT/JP2016/079252.
Jun. 30, 2017 Office Action issued in Taiwanese Patent Application No. 105134558.
May 1, 2018 Office Action issued in Japanese Patent Application No. 2016-160644.
Apr. 1, 2020 Office Action issued in U.S. Appl. No. 15/781,920.
Oct. 8, 2018 Extended Search Report issued in European Patent Application No. 16866038.9.
Feb. 25, 2019 Office Action issued in Chinese Patent Application No. 201680067269.9.
May 27, 2019 Office Action issued in Canadian Patent Application No. 3,005,579.
Aug. 5, 2020 Office Action issued in U.S. Appl. No. 15/781,920.
Feb. 17, 2021 Office Action issued in U.S. Appl. No. 15/781,920.

* cited by examiner

METHOD FOR PRODUCING NON-ORIENTED ELECTRICAL STEEL SHEET

TECHNICAL FIELD

This invention relates to a method for producing a non-oriented electrical steel sheet, and more particularly to a method for producing a non-oriented electrical steel sheet having a high magnetic flux density.

RELATED ART

In recent years, energy saving has been promoted from a viewpoint of global environment protection, and higher efficiency and downsizing are also directed in the field of electric instruments. As a result, non-oriented electrical steel sheets widely used as an iron core material for the electric instruments are strongly demanded to have a high magnetic flux density and a low iron loss.

In order to increase the magnetic flux density in the non-oriented electrical steel sheet, it is known effective to improve a texture of a product sheet, or decrease grains of {111} orientation and/or increase grains of {110} or {100} orientation. In the conventional production process of the non-oriented electrical sheet, therefore, the magnetic flux density is increased by increasing a crystal grain size before a cold rolling or optimizing a cold rolling reduction to improve the texture.

As another means for controlling the texture of the product sheet is mentioned a method of increasing a heating rate in recrystallization annealing. This method is often used in the production of grain-oriented electrical steel sheets, which is based on the fact that an iron loss is improved by increasing a heating rate in decarburization annealing (primary recrystallization annealing) to increase {110} orientation grains in the steel sheet after the decarburization annealing and refining secondary recrystallized grains of the steel sheet after finish annealing (for example, see Patent Document 1).

Even in the non-oriented electrical steel sheets is proposed a technique for improving the texture and increasing the magnetic flux density by increasing a heating rate in recrystallization annealing (finish annealing) (for example, see Patent Documents 2-5).

PRIOR ART DOCUMENTS

Patent Documents

Patent Document 1: JP-A-H01-290716
Patent Document 2: JP-A-H02-011728
Patent Document 3: JP-A-2011-256437
Patent Document 4: JP-A-2012-132070
Patent Document 5: JP-A-2013-010982

SUMMARY OF THE INVENTION

Task to be Solved by the Invention

However, the technique disclosed in Patent Document 1 relates to the grain-oriented electrical steel sheet and cannot be applied to a non-oriented electrical steel sheet as it is.

Although a rapid heating is conducted in the technique proposed in Patent Document 2, it is clear that when an induction heating not adopted in the Patent Document 2 is applied, an effect of increasing the magnetic flux density cannot be stably obtained as a result of the inventors' verification.

The technique proposed in Patent Document 3 utilizes an induction heating, but the effect of stably increasing the magnetic flux density cannot be obtained by this technique as a result of the inventors' verification. Also, this technique is required to conduct cooling and reheating after the rapid heating, so that there is a problem that the production cost and equipment cost become higher.

In the techniques proposed in Patent Documents 4 and 5, a rapid heating is conducted by an electric heating. In the electric heating, however, sparks are generated between a conductor roll and a steel sheet to easily cause surface defects, so that it causes a problem if the technique is applied to a finish annealing for a non-oriented electrical steel sheet.

The invention is made in view of the above problems inherent to the conventional techniques, and an object thereof is to propose a method for producing a non-oriented electrical steel sheet which is capable of stably attaining a higher magnetic flux density even when the heating in the finish annealing, is a rapid heating by an induction heating.

Solution for Task

The inventors have made various studies focusing on heating conditions in the finish annealing, especially conditions of an induction heating and a radiation heating to solve the above task. As a result, they have found out that it is effective to perform the heating in the finish annealing in two stages of conducting an induction heating and subsequently a radiation heating and conducting the induction heating from 600° C. to 740° C. at an average heating rate of not less than 50° C./sec in order to increase the magnetic flux density, and the invention has been accomplished.

That is, the invention proposes a method for producing a non-oriented electrical steel sheet by hot rolling a steel slab having a chemical composition comprising C: not more than 0.0050 mass %, Si: not more than 4.0 mass %, Mn: 0.03-3.0 mass %, P: not more than 0.1 mass %, S: not more than 0.005 mass %, Se: not more than 0.0010 mass %, Al: not more than 3.0 mass %, N: not more than 0.005 mass %, Ni: not more than 3.0 mass %, Cr: not more than 5.0 mass %, Ti: not more than 0.003 mass %, Nb: not more than 0.003 mass %, O: not more than 0.005 mass % and the remainder being Fe and inevitable impurities and subjecting the sheet to a cold rolling after a hot band annealing or without a hot band annealing and then to a finish annealing, characterized in that heating in the finish annealing is conducted in two stages of conducting an induction heating and subsequently a radiation heating, and a zone from 600° C. to 740° C. in the induction heating is heated at an average heating rate of not less than 50° C./sec.

The method for producing a non-oriented electrical steel sheet according to the invention is characterized in that a soaking temperature after the radiation heating is set to a temperature of 900° C. to 1100° C.

The method for producing a non-oriented electrical steel sheet according to the invention is characterized in that a final cold rolling in the cold rolling is conducted at a steel sheet temperature of not higher than 180° C.

The method for producing a non-oriented electrical steel sheet according to the invention is characterized in that a ferrite grain size of the steel sheet before the final cold rolling in the cold rolling is set to not more than 70 μm.

The steel slab used in the method for producing a non-oriented electrical steel sheet according to the invention is characterized by containing one or two selected from Sn: 0.005-0.20 mass % and Sb: 0.005-0.20 mass % in addition to the above chemical composition.

The steel slab used in the method for producing a non-oriented electrical steel sheet according to the invention is characterized by containing one or two or more selected from Ca: 0.0001-0.010 mass %, Mg: 0.0001-0.010 mass % and REM: 0.0001-0.010 mass % in addition to the above chemical composition.

Effect of the Invention

According to the invention, it is possible to stably provide a non-oriented electrical steel sheet having a high magnetic flux density.

EMBODIMENTS FOR CARRYING OUT THE INVENTION

There will be described an experiment building a momentum for developing the invention.

A steel containing C: 0.0023 mass %, Si: 1.2 mass %, Mn: 0.30 mass %, P: 0.05 mass %, S: 0.0015 mass %, Se: 0.0001 mass %, Al: 0.0005 mass %, N: 0.0018 mass %, Ni: 0.01 mass %, Cr: 0.01 mass %, Ti: 0.0012 mass %, Nb: 0.0004 mass % and O: 0.0019 mass % is melted in a laboratory to form a steel ingot, which is then hot rolled to form a hot rolled sheet having a sheet thickness of 2.2 mm. The hot rolled sheet is completely recrystallized and has a ferrite grain size of 40 μm.

Next, the hot rolled sheet is pickled and cold rolled by controlling a steel sheet temperature in the cold rolling (a temperature at an exit side of a rolling machine) to not higher than 160° C. to form a cold rolled sheet having a final sheet thickness of 0.35 mm, which is then subjected to a finish annealing (recrystallization annealing) at 900° C. for 10 seconds. In the finish annealing, the heating from room temperature to 740° C. is conducted by an induction heating, wherein an average heating rate from the room temperature to 600° C. is set to 20° C./sec and an average heating rate from 600° C. to 740° C. is varied within a range of 20 to 400° C./sec by adjusting an output power. After the completion of the induction heating, the steel sheet is subjected to a radiation heating in an electric furnace by heating at an average heating rate of 10° C./sec from the starting temperature of the radiation heating to 900° C. Moreover, the finish annealing is performed in an atmosphere having a ratio by vol % of $H_2$: $N_2$=20:80 and a dew point of −20° C. ($P_{H2O}$:$P_{H2}$=0.006).

From the thus obtained finish annealed sheet is taken out a test specimen of 180 mm×30 mm to measure a magnetic flux density $B_{50}$ by an Epstein test in accordance with JIS C2550-1 (2011) and evaluate magnetic properties thereof.

Figure 1:
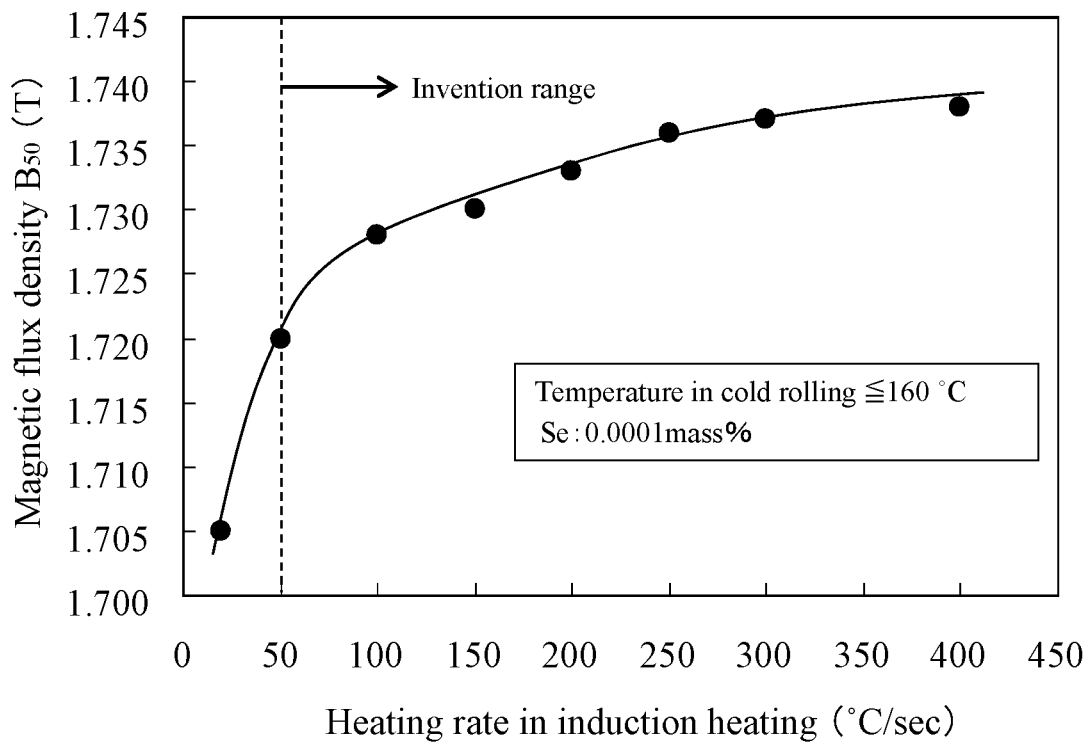
FIG. 1 is a graph showing an influence of a heating rate from 600° C. to 740° C. upon a magnetic flux density $B_{50}$.

FIG. 1 shows an influence of an average heating rate from 600° C. to 740° C. upon the magnetic flux density $B_{50}$. As seen from this figure, the magnetic flux density is increased by setting the heating rate to not less than 50° C./sec. As a result of examining the texture of the test specimen, it can be seen that the test specimen having a high magnetic flux density is low in {111} intensity. It is considered from these results that the reason why the magnetic properties is increased is due to the fact that recrystallization of {111} grains is suppressed by increasing the heating rate to promote the recrystallization of {110} grains and {100} grains. From the above, the average heating rate from 600° C. to 740° C. is set to not less than 50° C./sec.

As the experiment is further continued based on the above result, it is revealed that the magnetic properties are varied. In order to investigate the cause thereof, as textures and precipitates in the test specimens having inferior magnetic properties are examined, it is presumed that MnSe is precipitated in the grain boundary to hinder the grain growth.

In order to investigate an influence of Se content upon the magnetic properties, therefore, a steel containing C: 0.0022 mass %, Si: 1.4 mass %, Mn: 0.50 mass %, P: 0.06 mass %, S: 0.0019 mass %, Al: 0.0008 mass %, N: 0.0017 mass %, Ni: 0.01 mass %, Cr: 0.01 mass %, Ti: 0.0017 mass %, Nb: 0.0006 mass %, O: 0.0021 mass %, and Se varied within a range of 0.0001 to 0.002 mass % is melted in a laboratory to form a steel ingot, which is hot rolled into a hot rolled sheet having a sheet thickness of 2.3 mm. The hot rolled sheet is completely recrystallized and has a ferrite grain size of 30 μm.

Next, the hot rolled sheet is pickled, rolled to a thickness of 0.35 mm by setting a sheet temperature at an exit side of a cold rolling machine to not higher than 160° C. and subjected to a finish annealing at 920° C. for 10 seconds. The heating up to 740° C. in the finish annealing is conducted with an induction heating device, wherein an average heating rate from the room temperature to 600° C. is set to 20° C./sec and an average heating rate from 600° C. to 740° C. is set to two levels of 20° C./sec and 200° C./sec by adjusting an output power. The subsequent heating from 740° C. is conducted in an electric furnace, wherein an average heating rate from 740° C. to 920° C. is set to 10° C./sec. Moreover, an atmosphere in the finish annealing has a ratio by vol % of $H_2$: $N_2$=20:80 and a dew point of −20° C. ($P_{H2O}$/$P_{H2}$=0.006).

From the thus obtained finish annealed sheet is taken out a test specimen of 180 mm×30 mm to measure a magnetic flux density $B_{50}$ by an Epstein test in accordance with JIS C2550-1 (2011) and evaluate magnetic properties thereof.

Figure 2:
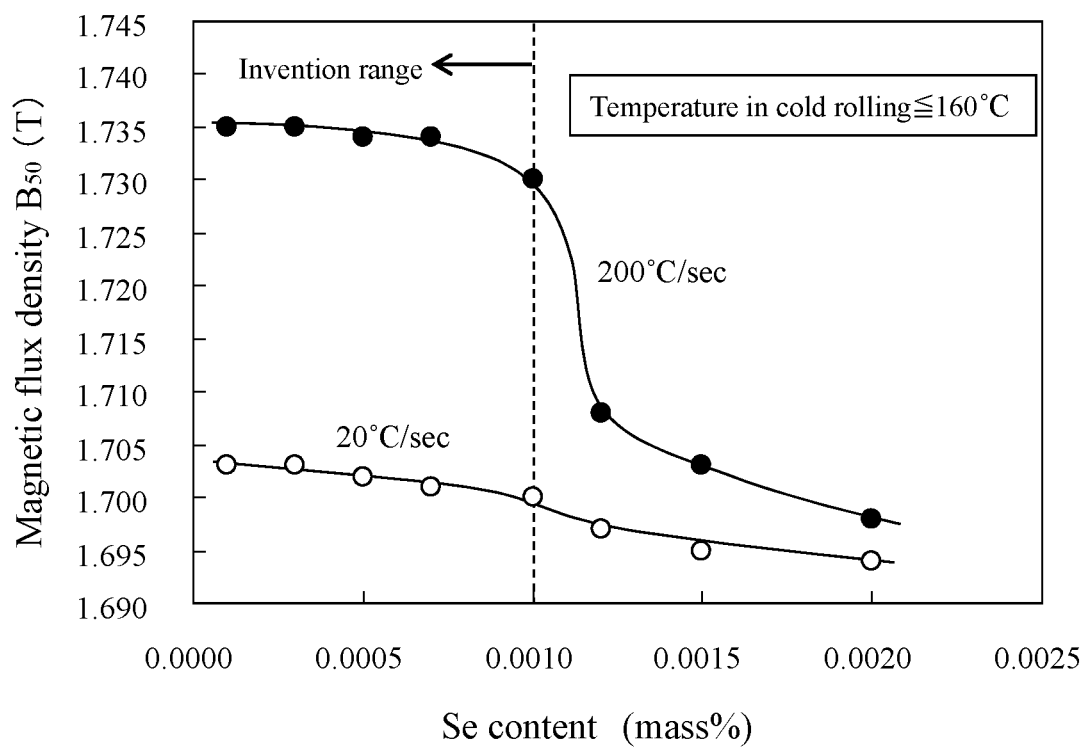
FIG. 2 is a graph showing an influence of a heating rate from 600° C. to 740° C. and Se content upon a magnetic flux density $B_{50}$.

FIG. 2 shows an influence of the heating rate and Se content upon the magnetic flux density $B_{50}$. As seen from this figure, the magnetic flux density is increased in such a region that the average heating rate from 600° C. to 740° C. is 200° C./sec and Se content is not more than 0.0010 mass %. That is, an effect of increasing the magnetic flux density by rapid heating can be obtained when Se content is not more than 0.0010 mass %.

The reason thereof is not sufficiently clear, but it is considered as follows.

Since a heating efficiency in a temperature region of not lower than 700° C. is decreased in the induction heating, the heating rate in this region becomes smaller as compared to a direct electric heating. Therefore, it is considered that Se-based precipitates are easily precipitated in the grain boundaries in the temperature region of not lower than 700° C. and the precipitates block grain growth in the subsequent radiation heating and hence grain growth of {100} and {110} grains having an orientation preferable to the magnetic properties is suppressed, whereby the effect of increasing the magnetic flux density cannot be obtained.

It is revealed from above that it is important to decrease Se as much as possible when the rapid heating is conducted by the induction heating.

The invention is developed on the basis of the above knowledge.

The chemical composition of the non-oriented electrical steel sheet (product sheet) according to the invention will be explained below.

C: not more than 0.0050 mass %

C is a harmful element causing magnetic aging to form a carbide deteriorating an iron loss in the product sheet. In order to suppress the magnetic aging, therefore, C is limited to not more than 0.0050 mass %. Preferably, it is a range of 0.0001 to 0.0040 mass %.

Si: not more than 4.0 mass %

Si has an effect of increasing a specific resistance of steel to reduce an iron loss and is preferable to be added in an amount of not less than 1.0 mass %. However, an addition exceeding 4.0 mass % makes rolling difficult, so that the upper limit is set to 4.0 mass %. From a viewpoint of considering the productivity to be important, it is preferably not more than 3.5 mass %. Also, Si reduces the iron loss but decreases the magnetic flux density. When the magnetic flux density is considered to be important, therefore, it is preferably not more than 3.0 mass %, and more preferably not more than 2.0 mass %.

Mn: 0.03-3.0 mass %

Mn has not only an effect of fixing S to prevent hot brittleness but also an effect of increasing a specific resistance of steel to reduce an iron loss. In order to obtain the above effects, it is necessary to be added in an amount of not less than 0.03 mass %. When it exceeds 3.0 mass %, however, the decrease of the magnetic flux density becomes remarkable. Therefore, Mn is in a range of 0.03-3.0 mass %. Preferably, it is in a range of 0.05-1.0 mass %.

P: not more than 0.1 mass %

P is an element used for controlling a hardness (punchability) of steel. When it is added in an amount exceeding 0.1 mass %, however, steel is embrittled to make rolling difficult, so that the upper limit of P is set to 0.1 mass %. Preferably, it is not more than 0.08 mass %.

Al: not more than 3.0 mass %

Al has an effect of increasing a specific resistance of steel to reduce an iron loss like Si. Since the above effect becomes remarkable with an addition amount of not less than 0.01 mass %, it is preferable to be added in an amount of not less than 0.01 mass %. When it exceeds 3.0 mass %, however, steel is hardened to make rolling difficult, so that the upper limit is set to 3.0 mass %. Preferably, it is not more than 2.0 mass %.

Ni: not more than 3.0 mass %

Ni is an element effective for adjusting the strength of steel and increasing the magnetic flux density. However, Ni is an expensive element, and an addition exceeding 3.0 mass % brings about the increase of raw material cost, so that the upper limit is set to 3.0 mass %. Preferably, it is not more than 1.0 mass %.

Cr: not more than 5.0 mass %

Cr has an effect of increasing a specific resistance of steel to reduce an iron loss. However, an addition exceeding 5.0 mass % brings about precipitation of carbonitride and adversely deteriorates the iron loss property, so that the upper limit of Cr is set to 5.0 mass %. Preferably, it is not more than 2.0 mass %.

Ti: not more than 0.003 mass %, Nb: not more than 0.003 mass %

Ti and Nb are harmful elements forming fine precipitates of carbonitride to increase an iron loss. Such an adverse effect becomes remarkable when each element exceeds 0.003 mass %. Therefore, an upper limit of each element is set to 0.003 mass %. Moreover, Ti and Nb may be added for the purpose of fixing nitride. Even in the latter case, the addition amount of each element is necessary to be within the above range.

Se: not more than 0.0010 mass %

Se is a harmful element forming MnSe to be precipitated in the grain boundary and blocking grain growth during the rapid heating in the finish annealing as previously mentioned, so that the upper limit is set to 0.0010 mass %. Preferably, it is not more than 0.0005 mass %.

S: not more than 0.005 mass %, N: not more than 0.005 mass %, O: not more than 0.005 mass %

S, N, and O are harmful elements forming fine precipitates of sulfide, nitride, oxide and the like to deteriorate the iron loss property. In particular, when the amount exceeds 0.005 mass %, the adverse effect becomes remarkable. Therefore, the upper limit of each element is set to 0.005 mass %. More preferably, it is not more than 0.003 mass %.

The non-oriented electrical steel sheet according to the invention can contain the following ingredients in addition to the aforementioned ingredients.

One or two selected from Sn: 0.005-0.20 mass % and Sb: 0.005-0.20 mass %

Each of Sn and Sb has an effect of improving recrystallization texture to improve the magnetic flux density and iron loss property. In order to obtain the above effect, each element is preferable to be added in an amount of not less than 0.005 mass %. However, when each element is added in an amount exceeding 0.20 mass %, the above effect is saturated. Therefore, each addition amount of Sn and Sb is preferable to be within a range of 0.005-0.20 mass %. More preferably, it falls in a range of 0.01-0.10 mass %.

One or two or more selected from Ca: 0.0001-0.010 mass %, Mg: 0.0001-0.010 mass %, REM: 0.0001-0.010 mass %

Each of Ca, Mg and REM has an effect of forming and fixing stable sulfides and/or selenides with S and/or Se to improve the grain growth. In order to obtain the above effect, each element is preferable to be added in an amount of not less than 0.0001 mass %. When it is added in an amount exceeding 0.010 mass %, however, the iron loss property is adversely deteriorated, so that the upper limit is preferably set to 0.010 mass %. More preferably, each element is added in a range of 0.001-0.005 mass %.

Next, the production method of the non-oriented electrical steel sheet according to the invention will be described below.

A steel adjusted to have the aforementioned chemical composition is melted by a well-known refining process such as converter-vacuum degassing treatment or the like and then shaped into a steel material (slab) by a well-known method such as continuous casting method or the like.

Next, the steel material is subjected to a hot rolling. A reheating temperature of the slab prior to the hot rolling, a finish rolling end temperature in the hot rolling, a coiling temperature and so on are not particularly limited. However, it is preferable that the reheating temperature falls in a range of 1000 to 1200° C. and the finish rolling end temperature falls in a range of 700° C. to 900° C. and the coiling temperature falls in a range of 600° C. to 800° C. from a viewpoint of ensuring the magnetic properties and productivity.

Then, the steel sheet after the hot rolling (hot rolled sheet) is subjected to a hot band annealing, if required, and one cold rolling or two or more cold rollings interposing an intermediate annealing therebetween to form a cold rolled sheet having a final sheet thickness.

In the invention, it is important that a ferrite grain size of the steel sheet structure before the final cold rolling (structure before the final cold rolling) is controlled to not more than 70 μm, preferably not more than 50 μm in order to enhance the effect of the invention. Here, the above ferrite grain size is an average grain size obtained by measuring grain sizes in a cross-sectional texture of the steel sheet in the thickness direction through an intercept method.

The inventors have considered the reason why the ferrite grain size of the steel sheet structure before the final cold rolling is preferably not more than 70 μm as follows.

Since recrystallized grains having a {111} orientation are produced from the vicinity of the grain boundary of the steel sheet structure before the final cold rolling in the finish annealing, when the ferrite grain size of the structure before the final cold rolling is small, {111} recrystallized grains are increased in the structure after the cold rolling and recrystallization. Thus, it is considered that {111} grains are easily encroached by {100} grains during the grain growth in the finish annealing and hence an effect of decreasing {111} grains by the rapid heating becomes remarkable.

In order to render the ferrite grain size before the final cold rolling into not more than 70 μm, it is preferable to omit the hot band annealing or intermediate annealing, and when such a treatment is conducted, it is preferable to decrease the annealing temperature as much as possible. From a viewpoint of preventing ridging, however, it is preferable that the recrystallization ratio of the steel sheet before the final cold rolling is controlled to not less than 80%. Moreover, there is a merit that a reduction of the production cost can be attained by decreasing the temperature in the hot band annealing or intermediate annealing or by omitting the hot band annealing or intermediate annealing.

Further, it is preferable to conduct the final cold rolling in the one cold rolling or two or more cold rollings interposing an intermediate annealing therebetween by adjusting the temperature of the steel sheet on the exit side of the cold rolling machine to not higher than 180° C. Preferably, it is not higher than 160° C. The reason therefor is as follows.

It is generally known that {100} grains are developed in the recrystallization annealing by conducting a warm rolling in which a temperature in the cold rolling is increased. When the temperature in the cold rolling is low, {111} grains are relatively developed in the recrystallization annealing, so that when the heating rate is slow as in the usual finish annealing, {111} grains are preferentially developed after the recrystallization. However, when the heating rate up to the completion of the recrystallization is increased, the recrystallization of {111} grains is suppressed and a ratio of {110} grains or {100} grains in the recrystallized grains is increased. The {111} grains are encroached by such {110} grains and {100} grains in the subsequent soaking to preferentially attain grain growth, whereby the magnetic flux density is increased.

Even when the temperature in the cold rolling is increased, {110} grains or {100} grains are easily recrystallized by increasing the heating rate. Since the temperature in the cold rolling is high, however, the ratio of {111} grains generated after the recrystallization is small as compared to the case that the rolling temperature is low, and hence the ratio of {111} grains encroached by {110} grains or {100} grains becomes small and the increase of the magnetic flux density cannot be recognized.

As mentioned above, an effect developed by applying a rapid heating in the finish annealing can be obtained when the temperature in the cold rolling (temperature of the steel sheet on the exit side of the cold rolling machine) is set to not higher than 180° C.

Next, the cold rolled sheet having a given final sheet thickness is subjected to a finish annealing. In the invention, it is necessary that the heating in the finish annealing is performed in two stages of conducting an induction heating and then a radiation heating.

It is preferable that the induction heating is of solenoid type. It is because the solenoid type has a merit that a heating efficiency is high and a uniformity of the temperature in the widthwise direction is excellent.

Next, the conditions of the induction heating in the finish annealing will be explained.

The induction heating is used in a preceding stage of the heating process in the finish annealing. In order to obtain the effect according to the invention, it is necessary to set an average heating rate from 600° C. to 740° C. to not less than 50° C./sec. The more preferable heating rate is not less than 100° C./sec. The upper limit of the heating rate is not particularly limited, but is preferably set to not more than 1000° C./sec from a viewpoint of reducing the equipment cost. Moreover, an average heating rate in a temperature range of lower than 600° C. is not particularly defined, but is preferably set to not less than 10° C./sec from a viewpoint of the productivity. Also, the upper limit of an achieving temperature by the induction heating (end temperature) is desirable to be not higher than 780° C. from a viewpoint of reducing the equipment cost.

The induction heating may be conducted by dividing into plural segments. Also, in order to reduce the equipment cost for the induction heating, the steel sheet is preheated by a radiation heating before the induction heating and then the induction heating may be applied only to a temperature range of the rapid heating. In this case, the upper limit of the preheating temperature is preferable to be set to not higher than 500° C. from a viewpoint of recovery prevention.

Next, the conditions of the radiation heating followed to the induction heating will be explained below.

After the end of the induction heating, the radiation heating is performed up to a predetermined soaking temperature. The time from the end of the induction heating to the start of the radiation heating is not particularly limited, but is preferable to be not more than 10 seconds from a viewpoint of the productivity. More preferably, it is not more than 5 seconds, further preferably not more than 3 seconds.

It is also preferable that the steel sheet temperature is not decreased to not higher than 700° C. from the end of the induction heating to the start of the radiation heating from a viewpoint of promoting recrystallization of {110} orientation grains or {100} orientation grains by the rapid heating. Such a condition can be easily attained by threading a dummy coil or the like in an annealing furnace to increase a furnace wall temperature between an induction heating furnace and a radiation heating furnace before the application of the invention. Moreover, the heating rate by the radiation heating is preferable to be not less than 5° C./sec from a viewpoint of promoting the recrystallization. Such a condition can be easily fulfilled by using a usual radiation heating furnace.

Here, the "radiation heating" in the invention means a system for heating the steel sheet by radiation from a heating element such as a radiant tube, an electric heater or the like, and a heating system of heating only by radiation from the furnace wall is excluded. A heating system not using the heating element such as a radiant tube, an electric heater or the like may be used, but it is not realistic considering the industrial productivity.

It is preferable that a soaking temperature after being heated by the radiation heating falls in a range of 900° C. to 1100° C. When the soaking temperature is lower than 900° C., the grain growth is difficult, while when the soaking temperature exceeds 1100° C., there is a fear of generating orientation grains harmful to the magnetic properties. Also, a soaking time is preferable to be a range of 1-60 seconds from the same viewpoint as the soaking temperature.

An atmosphere in the finish annealing is preferable to be a non-oxidizing atmosphere or a reduced atmosphere. For example, it is preferable to be a dry nitrogen atmosphere or a mixed atmosphere of hydrogen and nitrogen having $P_{H2O}/P_{H2}$ of not more than 0.1.

Thereafter, the steel sheet after the finish annealing is coated with an insulation coating, if necessary, to form a product sheet. As the insulating coating may be used any one of a known organic, inorganic or organic-inorganic mixed coating according to the purpose.

EXAMPLE

Each of steel slabs having various chemical compositions shown in Table 1 is reheated at 1100° C. for 20 minutes and hot rolled at a finish rolling end temperature of 750° C. to form a hot rolled sheet having a sheet thickness of 2.5 mm, which is coiled at a temperature of 630° C. Then, the hot rolled sheet is pickled after or without a hot band annealing for holding at a different temperature for 30 seconds and cold rolled to form a cold rolled sheet having a final sheet thickness shown in Table 2. In this case, a temperature at an exit side of the final cold rolling is varied within a range of 80° C. to 240° C. Moreover, the recrystallization ratios of all the steel sheets before the final cold rolling are 100%.

Next, the cold rolled sheet is subjected to a finish annealing at a soaking temperature shown in Table 2 with a continuous annealing facility heating the sheet by a combination of a solenoid type induction heating furnace and a radiant tube type radiation heating furnace. In this regard, the heating in the finish annealing is conducted by the induction heating while varying an average heating rate in a zone from 600° C. to 740° C. and the radiation heating through a radiation tube in the other temperature zone.

Moreover, the average heating rate up to a soaking temperature in the radiation heating furnace is set to 18° C./sec. Also, the time from the end of the induction heating to the start of the radiation heating is within 3 seconds, and the drop of the temperature from the end of the induction heating to the start of the radiation heating is within 10° C. Furthermore, the atmosphere in the induction heating furnace is a dry nitrogen atmosphere, and the atmosphere in the subsequent radiation heating furnace has a ratio by vol % of $H_2:N_2=20:80$ and a dew point of −40° C. ($P_{H2O}/P_{H2}=0.001$). An insulation coating is applied to form a product sheet.

TABLE 1

| Steel symbol | Chemical composition (mass %) | | | | | | | | | | | | | | Remarks |
|---|---|---|---|---|---|---|---|---|---|---|---|---|---|---|---|
| | C | Si | Mn | P | S | Al | N | Ni | Cr | Ti | Nb | Se | O | Others | |
| A | 0.0022 | 1.40 | 0.42 | 0.04 | 0.0018 | 0.0005 | 0.0016 | 0.01 | 0.01 | 0.0007 | 0.0005 | 0.0001 | 0.0023 | — | Invention steel |
| B | 0.0015 | 0.79 | 0.25 | 0.02 | 0.0016 | 0.62 | 0.0018 | 0.01 | 0.01 | 0.0008 | 0.0002 | 0.0001 | 0.0016 | — | Invention steel |
| C | 0.0018 | 3.10 | 0.25 | 0.01 | 0.0007 | 0.0002 | 0.0017 | 0.01 | 0.02 | 0.0012 | 0.0004 | 0.0002 | 0.0031 | — | Invention steel |
| D | 0.0019 | 0.91 | 1.20 | 0.01 | 0.0015 | 0.0003 | 0.0016 | 0.02 | 0.01 | 0.0014 | 0.0001 | 0.0001 | 0.0025 | — | Invention steel |
| E | 0.0015 | 1.31 | 0.12 | 0.02 | 0.0021 | 0.0001 | 0.0019 | 0.52 | 0.02 | 0.0011 | 0.0003 | 0.0002 | 0.0026 | — | Invention steel |
| F | 0.0014 | 1.34 | 0.31 | 0.01 | 0.0013 | 0.0001 | 0.0016 | 0.01 | 0.91 | 0.0015 | 0.0005 | 0.0001 | 0.0021 | — | Invention steel |
| G | 0.0024 | 1.61 | 0.18 | 0.06 | 0.0059 | 0.0002 | 0.0011 | 0.02 | 0.02 | 0.0005 | 0.0005 | 0.0001 | 0.0026 | — | Comparative steel |
| H | 0.0022 | 1.38 | 0.26 | 0.06 | 0.0016 | 0.0003 | 0.0057 | 0.01 | 0.01 | 0.0006 | 0.0003 | 0.0001 | 0.0024 | — | Comparative steel |
| I | 0.0015 | 1.33 | 0.22 | 0.04 | 0.0011 | 0.0001 | 0.0008 | 0.01 | 0.02 | 0.0004 | 0.0007 | 0.0002 | 0.0068 | — | Comparative steel |
| J | 0.0016 | 1.32 | 0.18 | 0.03 | 0.0012 | 0.0002 | 0.0013 | 0.01 | 0.01 | 0.0064 | 0.0004 | 0.0001 | 0.0028 | — | Comparative steel |
| K | 0.0011 | 1.24 | 0.28 | 0.05 | 0.0018 | 0.0001 | 0.0019 | 0.01 | 0.01 | 0.0002 | 0.0057 | 0.0001 | 0.0031 | — | Comparative steel |
| L | 0.0017 | 1.36 | 0.31 | 0.06 | 0.0016 | 0.0004 | 0.0015 | 0.02 | 0.01 | 0.0011 | 0.0002 | 0.0021 | 0.0038 | — | Comparative steel |
| M | 0.0022 | 1.61 | 0.53 | 0.04 | 0.0024 | 0.0005 | 0.0016 | 0.01 | 0.01 | 0.0007 | 0.0005 | 0.0001 | 0.0023 | Sn: 0.035 | Invention steel |
| N | 0.0015 | 1.31 | 0.67 | 0.02 | 0.0017 | 0.0005 | 0.0019 | 0.01 | 0.01 | 0.0008 | 0.0006 | 0.0001 | 0.0025 | Sb: 0.031 | Invention steel |
| O | 0.0014 | 1.48 | 0.55 | 0.05 | 0.0029 | 0.0001 | 0.0015 | 0.01 | 0.01 | 0.0006 | 0.0004 | 0.0001 | 0.0021 | Ca: 0.0035 | Invention steel |
| P | 0.0026 | 1.65 | 0.61 | 0.06 | 0.0015 | 0.0002 | 0.0016 | 0.01 | 0.01 | 0.0007 | 0.0003 | 0.0001 | 0.0023 | Mg: 0.0013 | Invention steel |

TABLE 1-continued

| Steel symbol | Chemical composition (mass %) | | | | | | | | | | | | | | Remarks |
|---|---|---|---|---|---|---|---|---|---|---|---|---|---|---|---|
| | C | Si | Mn | P | S | Al | N | Ni | Cr | Ti | Nb | Se | O | Others | |
| Q | 0.0023 | 1.32 | 0.45 | 0.03 | 0.0034 | 0.0011 | 0.0018 | 0.01 | 0.01 | 0.0007 | 0.0005 | 0.0001 | 0.0024 | REM: 0.0038 | Invention steel |
| R | 0.0021 | 1.54 | 0.34 | 0.04 | 0.0017 | 0.0006 | 0.0024 | 0.01 | 0.01 | 0.0006 | 0.0004 | 0.0001 | 0.0023 | Sn: 0.03, Sb: 0.03 | Invention steel |
| S | 0.0024 | 2.10 | 0.70 | 0.05 | 0.0019 | 0.0001 | 0.0021 | 0.01 | 0.01 | 0.0006 | 0.0004 | 0.0001 | 0.0021 | Sn: 0.04, Ca: 0.0030 | Invention steel |
| T | 0.0023 | 2.60 | 1.10 | 0.04 | 0.0018 | 0.0001 | 0.0023 | 0.01 | 0.01 | 0.0006 | 0.0003 | 0.0001 | 0.0021 | Sn: 0.03, Ca: 0.0025 | Invention steel |
| U | 0.0021 | 3.20 | 1.80 | 0.03 | 0.0017 | 0.0001 | 0.0018 | 0.01 | 0.01 | 0.0005 | 0.0004 | 0.0001 | 0.0024 | Sn: 0.03, Ca: 0.0032 | Invention steel |
| V | 0.0022 | 3.40 | 2.10 | 0.01 | 0.0019 | 0.0010 | 0.0018 | 0.01 | 0.01 | 0.0006 | 0.0006 | 0.0001 | 0.0021 | Sn: 0.03, Ca: 0.0025 | Invention steel |

From the thus obtained product sheet are taken out Epstein test specimens of 180 mm×30 mm in L direction and C direction to measure magnetic properties (iron loss $W_{15/50}$, magnetic flux density $B_{50}$) by an Epstein test in accordance with JIS C2550-1 (2011). The measured results are shown in Table 2.

As seen from Table 2, all of the steel sheets produced under conditions adapted to the invention have excellent magnetic properties. In particular, it can be seen that the magnetic flux density $B_{50}$ is largely increased when the ferrite grain size of the texture before the cold rolling is not more than 70 μm and the steel sheet temperature in the cold rolling is not higher than 180° C.

TABLE 2-1

| Steel sheet No. | Steel symbol | Hot band annealing temperature (° C.) | Ferrite grain size before final cold rolling (μm) | Sheet thickness (mm) | Temperature in cold rolling (° C.) | Finish annealing condition Average heating rate from 600° C. to 740° C. (° C./s) | Soaking temperature (° C.) | Magnetic properties Iron loss $W_{15/50}$ (W/kg) | Magnetic flux density $B_{50}$ (T) | Remarks |
|---|---|---|---|---|---|---|---|---|---|---|
| 1 | A | Absence | 30 | 0.50 | 160 | 20 | 920 | 3.91 | 1.704 | Comparative Example |
| 2 | A | Absence | 30 | 0.50 | 160 | 60 | 950 | 3.75 | 1.715 | Invention Example |
| 3 | A | Absence | 30 | 0.50 | 160 | 150 | 950 | 3.65 | 1.728 | Invention Example |
| 4 | A | Absence | 30 | 0.50 | 160 | 200 | 950 | 3.61 | 1.736 | Invention Example |
| 5 | A | Absence | 30 | 0.50 | 200 | 200 | 950 | 3.62 | 1.729 | Invention Example |
| 6 | A | Absence | 50 | 0.35 | 160 | 200 | 960 | 2.75 | 1.730 | Invention Example |
| 7 | A | Absence | 50 | 0.25 | 170 | 200 | 960 | 2.35 | 1.728 | Invention Example |
| 8 | A | Absence | 30 | 0.50 | 240 | 200 | 950 | 3.60 | 1.727 | Invention Example |
| 9 | A | Absence | 30 | 0.50 | 80 | 200 | 950 | 3.61 | 1.735 | Invention Example |
| 10 | A | Absence | 25 | 0.50 | 130 | 250 | 950 | 3.62 | 1.737 | Invention Example |
| 11 | A | 830 | 61 | 0.50 | 150 | 20 | 930 | 3.72 | 1.714 | Comparative Example |
| 12 | A | 830 | 61 | 0.50 | 150 | 200 | 960 | 3.62 | 1.730 | Invention Example |
| 13 | A | 900 | 85 | 0.50 | 160 | 20 | 940 | 3.62 | 1.719 | Comparative Example |
| 14 | A | 900 | 85 | 0.50 | 160 | 200 | 980 | 3.59 | 1.730 | Invention Example |
| 15 | B | Absence | 31 | 0.50 | 160 | 20 | 950 | 3.84 | 1.694 | Comparative Example |
| 16 | B | Absence | 31 | 0.50 | 170 | 200 | 930 | 3.52 | 1.724 | Invention Example |
| 17 | B | 850 | 65 | 0.50 | 170 | 20 | 950 | 3.64 | 1.703 | Comparative Example |
| 18 | B | 850 | 65 | 0.50 | 170 | 200 | 960 | 3.61 | 1.726 | Invention Example |

TABLE 2-1-continued

| Steel sheet No. | Steel symbol | Hot band annealing temperature (° C.) | Ferrite grain size before final cold rolling (μm) | Sheet thickness (mm) | Temperature in cold rolling (° C.) | Average heating rate from 600° C. to 740° C. (° C./s) | Soaking temperature (° C.) | Iron loss $W_{15/50}$ (W/kg) | Magnetic flux density $B_{50}$ (T) | Remarks |
|---|---|---|---|---|---|---|---|---|---|---|
| 19 | B | 930 | 95 | 0.50 | 170 | 20 | 980 | 3.62 | 1.708 | Comparative Example |
| 20 | B | 930 | 95 | 0.50 | 170 | 200 | 990 | 3.59 | 1.725 | Invention Example |
| 21 | C | 880 | 83 | 0.50 | 150 | 20 | 1000 | 2.98 | 1.691 | Comparative Example |
| 22 | C | 880 | 83 | 0.50 | 150 | 200 | 1000 | 2.78 | 1.719 | Invention Example |
| 23 | C | 850 | 63 | 0.50 | 220 | 20 | 950 | 2.94 | 1.695 | Comparative Example |
| 24 | C | 850 | 63 | 0.50 | 220 | 200 | 990 | 2.81 | 1.716 | Invention Example |
| 25 | D | Absence | 28 | 0.50 | 140 | 20 | 950 | 3.84 | 1.706 | Comparative Example |
| 26 | D | Absence | 28 | 0.50 | 140 | 200 | 950 | 3.64 | 1.731 | Invention Example |
| 27 | E | Absence | 24 | 0.50 | 160 | 20 | 960 | 3.81 | 1.708 | Comparative Example |
| 28 | E | Absence | 24 | 0.50 | 160 | 200 | 950 | 3.59 | 1.734 | Invention Example |
| 29 | F | Absence | 25 | 0.50 | 120 | 20 | 950 | 3.35 | 1.694 | Comparative Example |
| 30 | F | Absence | 25 | 0.50 | 120 | 200 | 980 | 3.05 | 1.725 | Invention Example |
| 31 | G | Absence | 19 | 0.50 | 150 | 200 | 980 | 4.41 | 1.701 | Comparative Example |
| 32 | H | Absence | 18 | 0.50 | 150 | 200 | 980 | 4.32 | 1.699 | Comparative Example |
| 33 | I | Absence | 16 | 0.50 | 150 | 200 | 980 | 4.25 | 1.689 | Comparative Example |
| 34 | J | Absence | 17 | 0.50 | 150 | 200 | 980 | 4.38 | 1.694 | Comparative Example |
| 35 | K | Absence | 16 | 0.50 | 150 | 200 | 980 | 4.37 | 1.699 | Comparative Example |
| 36 | L | Absence | 17 | 0.50 | 150 | 200 | 980 | 4.65 | 1.702 | Comparative Example |
| 37 | M | Absence | 35 | 0.50 | 170 | 200 | 960 | 3.60 | 1.739 | Invention Example |
| 38 | N | Absence | 32 | 0.50 | 170 | 200 | 960 | 3.59 | 1.740 | Invention Example |
| 39 | O | Absence | 28 | 0.50 | 170 | 200 | 960 | 3.55 | 1.738 | Invention Example |
| 40 | P | Absence | 33 | 0.50 | 170 | 200 | 960 | 3.56 | 1.739 | Invention Example |
| 41 | Q | Absence | 38 | 0.50 | 170 | 200 | 960 | 3.57 | 1.741 | Invention Example |
| 42 | R | Absence | 32 | 0.50 | 170 | 200 | 960 | 3.59 | 1.745 | Invention Example |
| 43 | S | Absence | 50 | 0.50 | 170 | 150 | 980 | 2.94 | 1.725 | Invention Example |
| 44 | S | Absence | 50 | 0.35 | 180 | 150 | 980 | 2.45 | 1.725 | Invention Example |
| 45 | S | Absence | 50 | 0.25 | 180 | 150 | 980 | 2.31 | 1.725 | Invention Example |
| 46 | S | Absence | 50 | 0.20 | 180 | 150 | 980 | 2.21 | 1.725 | Invention Example |
| 47 | T | Absence | 45 | 0.35 | 170 | 200 | 1000 | 2.35 | 1.723 | Invention Example |
| 48 | T | Absence | 45 | 0.25 | 170 | 200 | 1000 | 2.15 | 1.723 | Invention Example |
| 49 | U | Absence | 65 | 0.35 | 170 | 200 | 1000 | 2.25 | 1.720 | Invention Example |
| 50 | U | Absence | 65 | 0.25 | 180 | 200 | 1000 | 2.05 | 1.720 | Invention Example |
| 51 | V | Absence | 70 | 0.35 | 170 | 200 | 1000 | 2.15 | 1.719 | Invention Example |
| 52 | V | Absence | 70 | 0.20 | 180 | 200 | 1000 | 2.10 | 1.719 | Invention Example |

The invention claimed is:

1. A method for producing a non-oriented electrical steel sheet, the method including:
hot rolling a steel slab to form a steel sheet, the steel slab having a chemical composition comprising
C: not more than 0.0050 mass %,
Si: not more than 4.0 mass %,
Mn: 0.03-3.0 mass %,
P: not more than 0.02 mass %,
S: not more than 0.005 mass %,
Se: 0.0001-0.0010 mass %,
Al: not more than 3.0 mass %,
N: not more than 0.005 mass %,
Ni: not more than 3.0 mass %,
Cr: not more than 5.0 mass %,
Ti: not more than 0.003 mass %,
Nb: not more than 0.003 mass %,
O: not more than 0.005 mass %, and
the remainder being Fe and inevitable impurities and
subjecting the steel sheet to a cold rolling after a hot band annealing or without a hot band annealing and further to a finish annealing,
wherein
the cold rolling includes a final cold rolling in which a temperature of the steel sheet on an exit side of a cold rolling machine in the final cold rolling is adjusted to not higher than 180° C.,
the finish annealing includes conducting heating in two stages including an induction heating and subsequently a radiation heating,
the induction heating includes a zone heating at an average heating rate of not less than 50° C./sec in a zone from 600° C. to 740° C., and
wherein a time from an end of the induction heating to a start of the radiation heating is not more than 10 seconds.

2. The method for producing a non-oriented electrical steel sheet according to claim 1, wherein a soaking temperature after the radiation heating is 900° C. to 1100° C.

3. The method for producing a non-oriented electrical steel sheet according to claim 2, wherein a ferrite grain size of the steel sheet before the final cold rolling in the cold rolling is not more than 70 μm.

4. The method for producing a non-oriented electrical steel sheet according to claim 3, wherein the chemical composition of the steel slab further comprises one or more groups of the following groups of A and B:
Group A: one or more elements selected from
Sn: 0.005-0.20 mass % and
Sb: 0.005-0.20 mass %, and
Group B: one or more elements selected from
Ca: 0.0001-0.010 mass %,
Mg: 0.0001-0.010 mass %, and
REM: 0.0001-0.010 mass %.

5. The method for producing a non-oriented electrical steel sheet according to claim 2, wherein the chemical composition of the steel slab further comprises one or more groups of the following groups of A and B:
Group A: one or more elements selected from
Sn: 0.005-0.20 mass % and
Sb: 0.005-0.20 mass %, and
Group B: one or more elements selected from
Ca: 0.0001-0.010 mass %,
Mg: 0.0001-0.010 mass %, and
REM: 0.0001-0.010 mass %.

6. The method for producing a non-oriented electrical steel sheet according to claim 1, wherein a ferrite grain size of the steel sheet before the final cold rolling in the cold rolling is not more than 70 μm.

7. The method for producing a non-oriented electrical steel sheet according to claim 6, wherein the chemical composition of the steel slab further comprises one or more groups of the following groups of A and B:
Group A: one or more elements selected from
Sn: 0.005-0.20 mass % and
Sb: 0.005-0.20 mass %, and
Group B: one or more elements selected from
Ca: 0.0001-0.010 mass %,
Mg: 0.0001-0.010 mass %, and
REM: 0.0001-0.010 mass %.

8. The method for producing a non-oriented electrical steel sheet according to claim 1, wherein the chemical composition of the steel slab further comprises one or more groups of the following groups of A and B:
Group A: one or more elements selected from
Sn: 0.005-0.20 mass % and
Sb: 0.005-0.20 mass %, and
Group B: one or more elements selected from
Ca: 0.0001-0.010 mass %,
Mg: 0.0001-0.010 mass %, and
REM: 0.0001-0.010 mass %.

9. The method for producing a non-oriented electrical steel sheet according to claim 1, wherein
the average heating rate is not less than 200° C./sec.

10. The method for producing a non-oriented electrical steel sheet according to claim 1, wherein the steel sheet is subjected to the cold rolling without the hot band annealing.

11. The method for producing a non-oriented electrical steel sheet according to claim 1, wherein the non-oriented electrical steel sheet has an iron loss that is in a range of from 2.05-2.45 W/kg.

12. The method for producing a non-oriented electrical steel sheet according to claim 1, wherein a heating rate of the radiation heating after the induction heating is not less than 5° C./sec.

* * * * *